United States Patent [19]

Naffziger

[11] 4,279,452

[45] Jul. 21, 1981

[54] BEARING ASSEMBLY

[75] Inventor: Larry C. Naffziger, Fresno, Calif.

[73] Assignee: Bank of America N.T. & S.A., Fresno, Calif.

[21] Appl. No.: 42,143

[22] Filed: May 24, 1979

[51] Int. Cl.$^3$ ........................ F16C 33/10; F16C 33/74

[52] U.S. Cl. .................................. 308/36.1; 308/121; 308/240

[58] Field of Search ..................... 308/36.1, 36.3, 121, 308/134.1, 240, DIG. 15

[56] References Cited

U.S. PATENT DOCUMENTS

| | | | |
|---|---|---|---|
| 1,889,397 | 11/1932 | Baumheckel | 308/121 |
| 2,161,862 | 6/1939 | Hait | 308/134.1 |
| 2,573,138 | 10/1951 | Gerner | 308/36.1 |
| 3,104,918 | 9/1963 | Horan, Jr. et al. | 308/36.1 |
| 3,411,706 | 11/1968 | Woollenweber, Jr. et al. | 308/121 |
| 3,718,209 | 2/1973 | Moslo | 308/36.1 |

*Primary Examiner*—Richard R. Stearns

*Attorney, Agent, or Firm*—Huebner & Worrel

[57] ABSTRACT

A bearing assembly for use in fluid pumps having a pump housing through which a pump drive shaft is extended for rotation about an axis of rotation, the bearing assembly including a pair of sleeves dimensioned to be fitted within the pump housing substantially concentric to the axis of rotation and about the drive shaft and spaced from each other to form an annular lubricant reservoir therebetween and about the drive shaft.

2 Claims, 3 Drawing Figures

34
25
11
42
59
58
57
55
13
14
20
17
32
40
16
50
42
18
15
19
30
27
33
51
52
28
29
53
54
86
29
42
11
87
85
42
80
81
71
70
72
73
31
77
79
78
41
42
42
25
10
13
14
13
12
16
18
20
15
11
42
42
34

BEARING ASSEMBLY

BACKGROUND OF THE INVENTION

1. Field of the Invention

The present invention relates to a bearing assembly and more particularly to a bearing assembly having particular utility in existing conventional pump housings permitting a lubricant reservoir to be formed about the drive shaft sealed from high pressure fluids passing through the pump.

2. Description of the Prior Art

Fluid pumps and particularly submersible high pressure turbine pumps of the type used in water wells are subject to constant abrasion from particulate matter borne by the fluids passing through the pump at high pressure. This problem is particularly acute at the bearing surfaces where sand and the like penetrate over a relatively short period of use. Where such penetration occurs, the high speeds of rotation cause very rapid wearing of the engaged metal surfaces thereby destroying the pump over a relatively short period of operation unless repaired. Since repair of the submersed portions of such pumps is extremely expensive and renders the pump unusable for protracted periods, frequent repair creates considerable hardship.

Most prior art bearing construction calls simply for the use of engaged metal surfaces and a variety of types of seals in an effort to prevent the influx of such particulate matter. As noted, such construction has not been found successfully to preclude rapid destruction of the engaged surfaces particularly in wells having a high sand content.

The Horan, Jr. et al. U.S. Pat. No. 3,104,918 discloses a shaft sealing means for turbine type pumps and the like which is directed toward solving these problems by providing a lubricant reservoir in the pump housing to provide lubrication for the bearing surfaces so as to minimize such wearing of the engaged metal surfaces. While this form of construction has been found useful in such applications, it is disadvantageous in that the device requires that the pump housing be manufactured with a reservoir and seals. Thus existing pump housings are incapable of using the device of this invention. Since most pumps presently in use do not have this form of construction, it is inapplicable to them.

Therefore, it has long been known that it would be desirable to have a bearing assembly which is capable of use in existing as well as new fluid pumps to form a lubricant reservoir within the pump and about the drive shaft sealed from high pressure fluids and capable of vastly extending the lives of fluid pumps even in applications where fluids passing through the pump have a high content of particulate matter.

SUMMARY OF THE INVENTION

Therefore, it is an object of the present invention to provide an improved bearing assembly for fluid pumps.

Another object is to provide such a bearing assembly which has particular utility in existing fluid pumps permitting installation in virtually any type of pump housing for performance of its various functions.

Another object is to provide such a bearing assembly which, in assembled condition, forms a lubricant reservoir of annular configuration extending about the drive shaft to provide lubrication for the engaged metal surfaces of the bearing minimizing wear to such surfaces.

Another object is to provide such a bearing assembly which isolates the lubricant reservoir thereof to such an extent as virtually to preclude the influx of particulate matter over for an extended operational life thereby extending the lives of the various components of the pump far beyond that heretofore achieved.

Another object is to provide such a bearing assembly which is of very simple construction and can be installed in existing pump housings quite simply and inexpensively.

Another object is to provide such a bearing assembly which operates in cooperation with the engaged metal surfaces to disperse the lubricant from the lubricant reservoir during normal operation in quantities providing the optimum lubrication for such surfaces without affording space for the influx of particulate matter and which provides a self cleaning action tending automatically to free the bearing assembly of any particulate matter which should gain admission.

Another object is to provide such a bearing assembly which has a seal operating under fluid pressure to make outward movement of lubricant therethrough easier than the inward movement of fluid and particulate matter.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
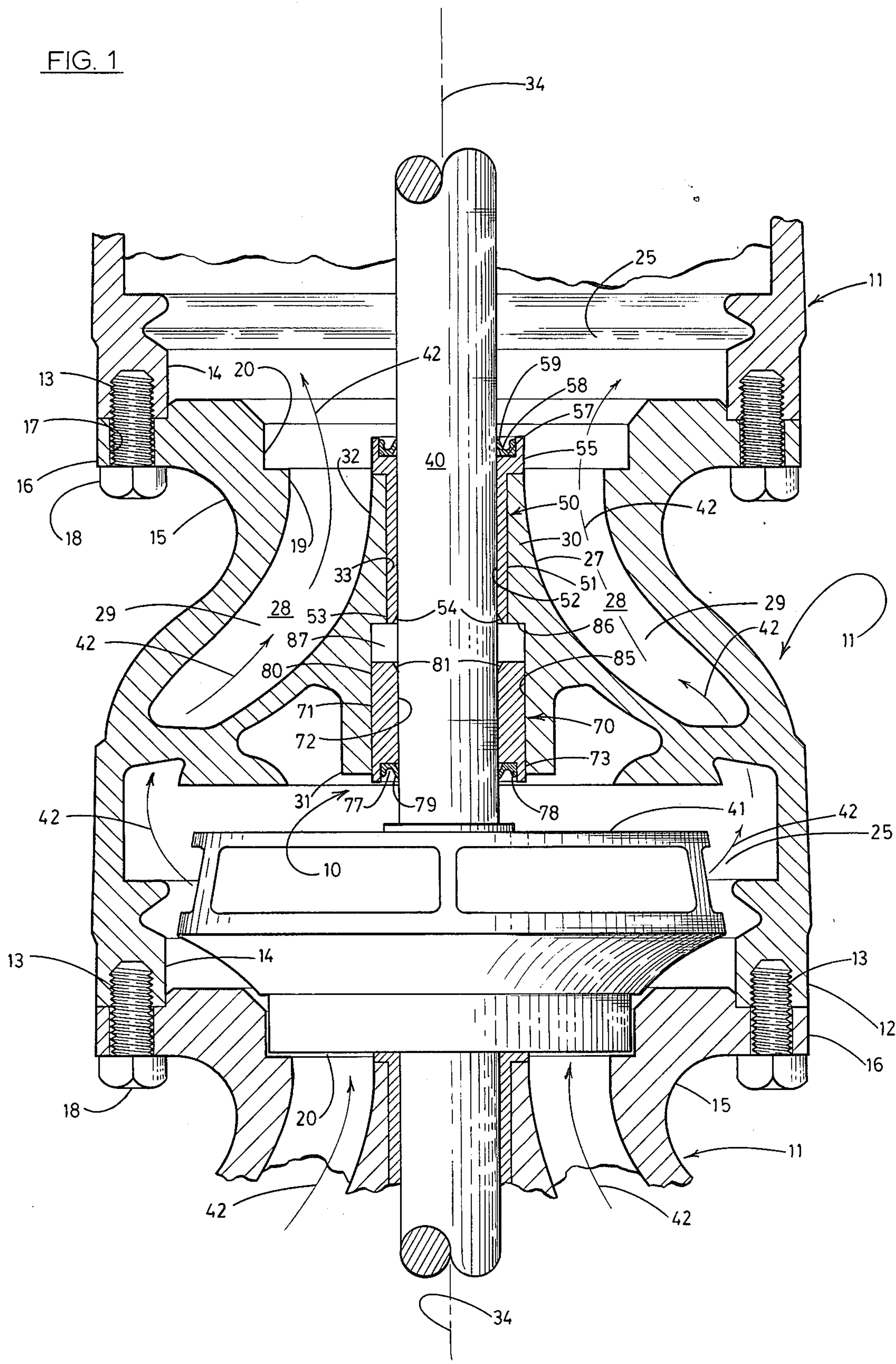
FIG. 1 is a fragmentary vertical section of a pump housing and pump drive shaft mounting the bearing assembly of the present invention in a typical operative environment.

Referring more particularly to the drawings, the bearing assembly of the present invention is generally indicated by the numeral 10 in FIG. 1. As shown in FIG. 1, the bearing assembly is mounted in a typical operative environment in a pump housing or bowl casting 11. A plurality of such pump housings are operably interconnected in series relation forming the submerged portion of a pump assembly in a water well.

Each pump housing 11 has a lower peripheral wall 12 having a plurality of screw threaded bores 13 extending into the wall. The wall bounds a lower opening 14. The pump housing has an upper peripheral wall 15 from which is extended a radial flange 16. A plurality of bolt holes 17 are formed in the radial flange in a pattern arranged to match that of the screw threaded bores 13 of the next adjacent pump housing. The radial flange of each pump housing is secured on the lower peripheral wall 13 of the next adjacent pump housing by a plurality of bolts 18 individually extending through the bolt holes and tightened into the screw threaded bores, as shown in FIG. 1. The pump housings are thus interconnected in end-to-end fluid tight relation. Each pump housing 11 has an upper opening or throat 19 circumscribed by a counterbore 20.

The lower peripheral wall 12 of each pump housing 11 defines an impeller chamber 25 which adjoins the lower opening 14 of the pump housing, as shown in FIG. 1. Each pump housing has a bearing portion 27 above the impeller chamber. The bearing portion has a plurality of vanes 28 extending to the upper peripheral wall and defining passages therebetween extending in volutes from the impeller chamber to the throat 19 of the pump housing. The bearing portion has a central core 30, having a lower end 31 and an opposite upper end 32. The central core is pierced axially by a central bore 33 of predetermined diameter defining an axis of rotation 34. The axis of rotation of the various pump housings are, of course, aligned in assembled condition so a single axis of rotation for the entire assembly is provided.

A pump drive shaft 40 is extended through the central bores 33 of the assembled pump housings 11 for rotational movement about the axis of rotation 34. In conventional construction, a conventional bearing assembly, not shown, is mounted in the bearing portion 27 of each pump housing to mount the drive shaft for such rotational movement. An impeller 41 is mounted on the drive shaft within the impeller chamber 25 of each pump housing for rotation by the drive shaft about the axis of rotation. For illustrative convenience, an impeller is shown in only one of the pump housings in FIG. 1. During operation, the impellers are rotated at high speed by the drive shaft to develop a path of fluid movement through the pump housings along the path indicated by arrows 42.

The bearing assembly 10 of the present invention is adapted to be manufactured and assembled as part of a new pump assembly, or installed in existing pump assemblies. The bearing assembly 10 has an upper bearing sleeve 50 shown in FIG. 2. The upper bearing sleeve has a cylindrical body portion 51 of a diameter adapted to be press fitted within the central bore 33 of the central core 30. Similarly, the bearing sleeve has a cylindrical passage 52 concentric to the body portion and having a diameter adapted to receive the drive shaft 40 therewithin in a close tolerance fit for rotation about the axis of rotation 34.

Figure 2:
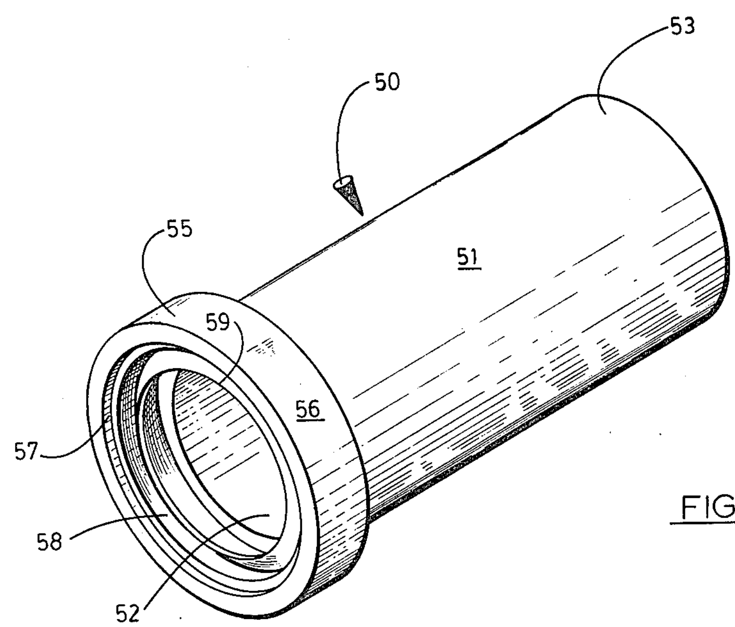
FIG. 2 is a somewhat enlarged perspective view of a first bearing sleeve of the bearing assembly.

The upper bearing sleeve 50 has a lower end portion 53 with a tapered or conical surface 54 extending into the cylindrical passage 52 from the lower end portion in converging relation. The bearing sleeve has an upper radial portion 55 extending to a peripheral surface 56 preferably of the same diameter as the upper end 32 of the central core 30 of the pump housing 11. A recess 57 is provided in the upper radial portion concentric to the cylindrical passage and communicating therewith. A resilient ring 58, substantially U-shaped in cross section, is mounted within the recess and extending inwardly to an annular lip 59 concentric to the cylindrical passage and is preferably of a slightly smaller diameter than the cylindrical passage. In cross section the lip is disposed at an oblique angle extending inwardly in a direction substantially away from the lower end portion of the upper bearing sleeve. In other words, the lip converges in a direction generally away from the lower end portion, as best shown in FIG. 2.

Figure 3:
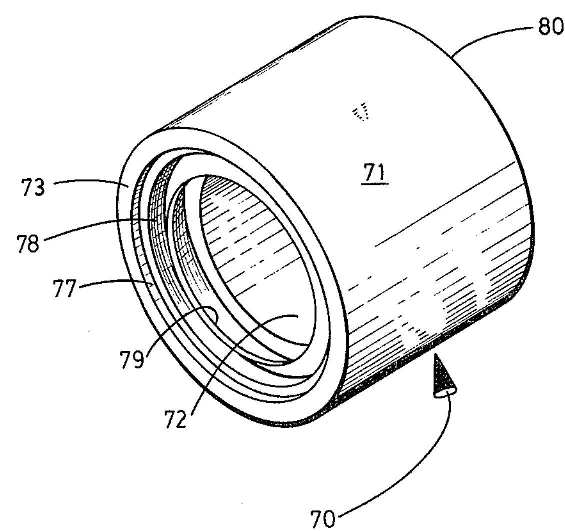
FIG. 3 is a perspective view of a second sleeve of the bearing assembly.

The bearing assembly 10 has a lower bearing sleeve 70 shown in FIG. 3, the upper and lower bearing sleeves constituting a sleeve assembly. The lower bearing sleeve has a cylindrical body portion 71. A cylindrical passage 72, of the same diameter as cylindrical passage 52 of the upper bearing sleeve 50, extends through the lower bearing sleeve concentric to the body portion. The body portion has a lower end portion 73 with a recess 77 therewithin extending about the cylindrical passage and concentric thereto. A resilient ring 78, substantially U-shaped in cross section and substantially identical to resilient ring 58 of the upper bearing sleeve, is mounted within the recess. The resilient ring extends to an annular lip 79 concentric to the cylindrical passage and preferably of a slightly smaller diameter than the cylindrical passage. As with ring 58, in cross section the lip 79 is disposed at an oblique angle extending inwardly in a direction substantially away from the lower end portion of the upper bearing sleeve. In other words, the lip converges in a direction generally away from the lower end portion, as best shown in FIG. 3.

The lower bearing sleeve 70 has an upper end portion 80 with a tapered or conical surface 81 extending into the cylindrical passage from the upper end portion.

As shown in FIG. 1, a counterbore 85 is formed in the central core 30 of the bearing portion 27 of the pump housing 11 for installation of the bearing assembly 10 of the present invention. The counterbore extends inwardly from the lower end 31 of the central core concentric to the axis of rotation 34. The counterbore extends to an inner surface 86 preferably, although not necessarily, substantially coplanar with the lower end portion 53 of the upper bearing sleeve. The lower bearing sleeve 70 is press fitted within the counterbore 85 to the position shown in FIG. 1 with the drive shaft 40 extending rotationally therethrough. The distance between the upper end portion 80 and the inner end surface 86 of the counterbore 85 defines a lubricant reservoir 87 of annular configuration extending about the drive shaft. At the time the upper and lower bearing sleeves are press fitted into the central bore 33 and counterbore 35 respectively, the reservoir is filled with a suitable grease type lubricant, not shown. Thus, the lubricant is captured in the lubricant reservoir.

OPERATION

The operation of the described embodiment of the subject invention is believed to be clearly apparent and is briefly summarized at this point. With the bearing assembly 10 installed in each pump housing 11 as previously described, the pump is simply operated in the normal manner to drive the impellers 41 by way of the drive shaft 40 to pump water along the path of fluid movement 42. Heat generated by the rotational engagement of the upper and lower bearing sleeves 50 and 70 with the drive shaft causes the grease contained within the lubricant reservoir to be liquified and to flow from the reservoir within the conical surfaces 54 and 81 and thus to be directed into the cylindrical passages 52 and 72 and about the drive shaft. This provides lubrication for the engaged metal surfaces as well as tending to cool those surfaces.

Simultaneously, fluid pressure within the pump housing 11 presses the resilient rings 58 and 78 inwardly causing the annular lips 59 and 79 thereof to be constricted or further tightened about the drive shaft. This has been found virtually to preclude the penetration of particulate matter, such as sand, between the bearing sleeves and the drive shaft which in conventional construction rapidly destroys the bearing. Further, the invasion of the lubricant between those surfaces in the close tolerance fit coupled with its movement generally toward the resilient rings acts to flush particulate matter from the bearing assembly. Still further, if particulate matter should eventually work its way past the resilient rings, the lubricant acts to minimize its destructive effect.

It has been found in operation that the bearing assembly operates vastly to extend the lives of pumps within which it is installed by effectively isolating the engaged metal surfaces of the bearing from the influx of particulate matter while providing the optimum lubrication. This is accomplished with a structure which can be installed in existing pump housings so as not to require the manufacture of entirely new pump housings. Furthermore, it has been discovered that the close tolerance fit of the engaged metal surfaces, the annular reservoir, the conical surfaces and the heat generated during operation interoperate to distribute the lubricant in an optimum manner automatically during operation of the pump. This provides both the degree of lubricity desired and a fluid movement acting to free the bearing of any particulate matter which may work its way in coupled with a movement in a direction adapted to prevent other particulate matter from gaining entrance. Still further, the flexing of the resilient rings under fluid pressure from the exterior of the bearing operates as an initial barrier to such matter. The lips 59 and 79 thus make it easier for lubricant to pass outwardly from the bearing assembly than for fluid and particulate matter to pass inwardly.

After an operational life far surpassing that heretofore achieved, if and when the rings 58 and 78 give way and the supply of lubricant within the reservoir 87 is depleted, the resulting influx of fluid allows the bearing assembly then to operate as a water lubricated bearing. This further extends the life of the bearing assembly.

Therefore, the bearing assembly of the present invention provides the capability for new as well as existing pump housings to have their operative lives extended well beyond that which, it is believed, has heretofore been possible in an assembly which is inexpensive to purchase and install, which substantially reduces the yearly cost of well maintenance by extending the lives of such pumps and which is fully effective in achieving its objectives.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A bearing assembly for water pumps and the like having a submersible pump housing with a central bore through which a drive shaft is adapted to be extended for rotation about an axis of rotation and a counterbore disposed in axial alignment with the central bore concentric to the axis of rotation, the bearing assembly comprising a first bearing sleeve having an external diameter adapted to be fitted in fixed position in said central bore and a cylindrical internal passage having a diameter adapted to receive the drive shaft in fitted rotational relation and the internal passage having an end portion with a substantially conical surface convergent in the direction of said internal passage; a second bearing sleeve having an external diameter adapted to be fitted in fixed position in said counterbore spaced from the end portion of the first bearing sleeve to define a reservoir for lubricant therebetween, a cylindrical internal passage having substantially the same diameter as said internal passage of the first bearing sleeve for receipt of the drive shaft in rotational relation and having a substantially conical surface convergent in the direction of said internal passage of the second bearing sleeve; and resilient rings individually borne by each sleeve remote from the lubricant reservoir, facing outwardly of the bearing assembly and flexible under fluid pressure to form a barrier against the penetration of fluid and particulate matter into said sleeves while permitting lubricant to pass therethrough outwardly of the bearing assembly to urge particulate matter from the bearing assembly.

2. The bearing assembly of claim 1 wherein said resilient rings have circular central lip portions dimensioned for engagement with the drive shaft, are individually housed in recesses in the sleeves and are concave in cross section facing outwardly of the bearing assembly to flex under fluid pressure to cause said lip portions to be constricted about the drive shaft in sealing relation.

* * * * *